(No Model.)
G. F. CLARK.
HARROW.
No. 310,793. Patented Jan. 13, 1885.
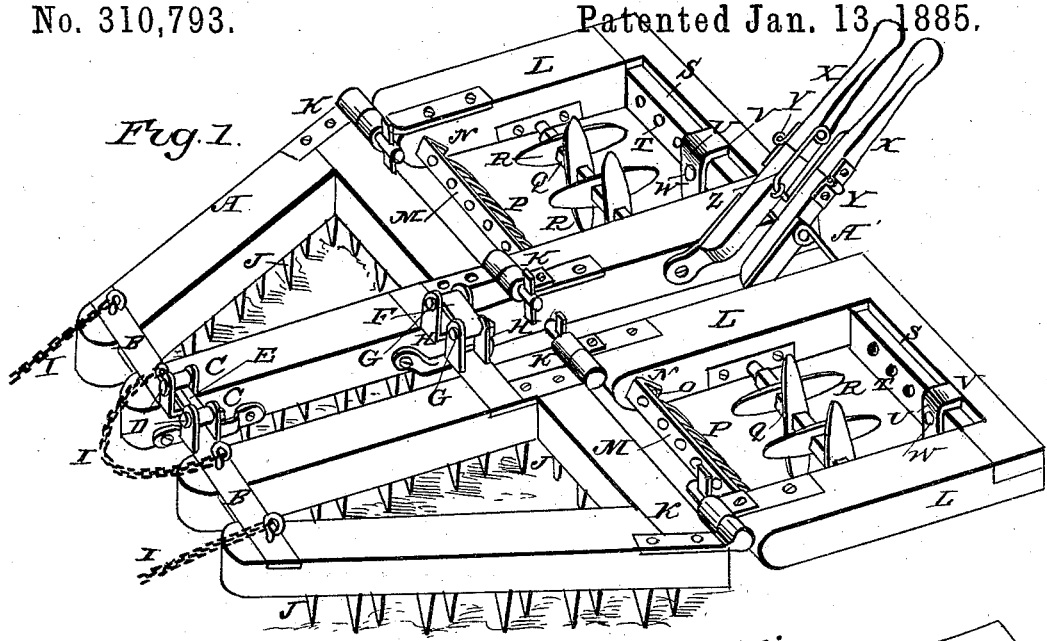
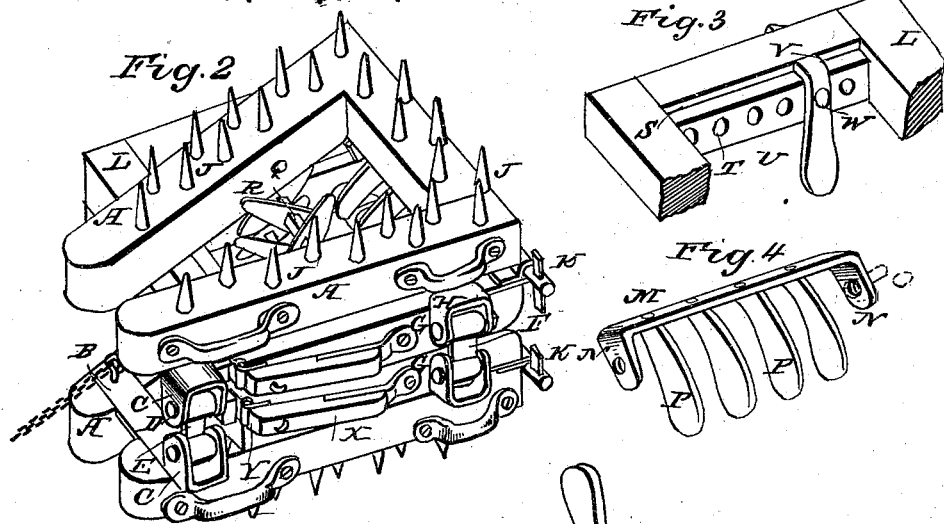
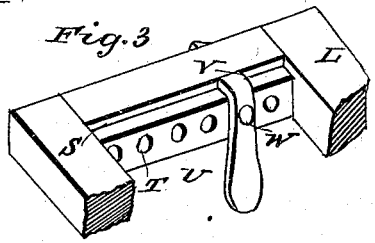
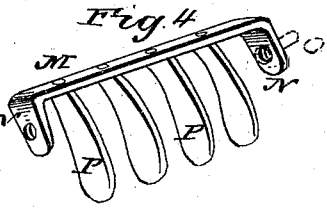
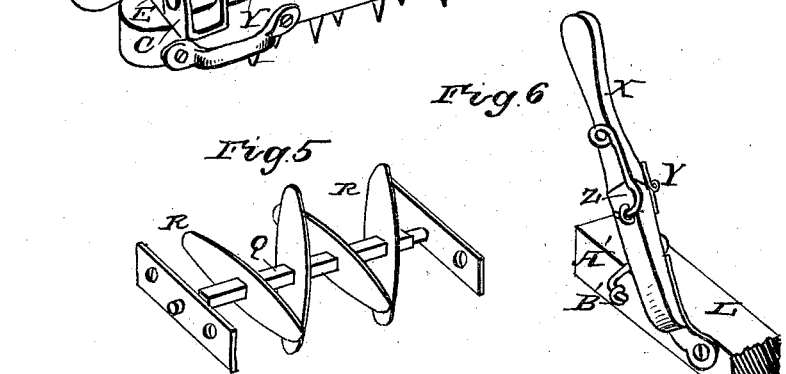
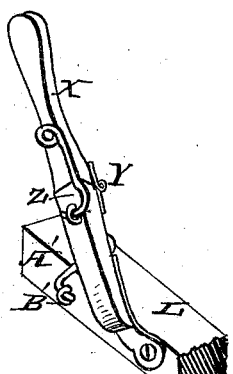
WITNESSES:
Fred. G. Dieterich
Wm Lecher
INVENTOR.
George F. Clark
By Louis Bagger & Co.
ATTORNEYS.

UNITED STATES PATENT OFFICE.

GEORGE F. CLARK, OF RAVENSWOOD, WEST VIRGINIA.

HARROW.

SPECIFICATION forming part of Letters Patent No. 310,793, dated January 13, 1885.

Application filed July 12, 1884. (No model.)

*To all whom it may concern:*

Be it known that I, GEORGE F. CLARK, a citizen of the United States, and a resident of Ravenswood, in the county of Jackson and State of West Virginia, have invented certain new and useful Improvements in Harrows; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved harrow. Fig. 2 is a similar view of the harrow folded, and Figs. 3, 4, 5, and 6 are perspective detail views of the several parts of the harrow.

Similar letters of reference indicate corresponding parts in all the figures.

My invention has relation to combined harrows, clod-crushers, and land-markers; and it consists in the improved construction and combination of parts of the same, as hereinafter more fully described and claimed.

In the accompanying drawings, the letters A A indicate two frames having their outer side pieces converging toward the forward ends of the frames, and having the said forward ends open and connected by means of straps B, the ends of which straps form perforated lugs C, through which pass bolts D, upon which a link, E, is hinged, the said link connecting the forward portions of the inner side pieces of the frames together, and the rear portions of the said inner side pieces are connected by means of a link, F, hinged upon bolts G, passing through lugs H, projecting from the side pieces. The forward ends of the side pieces of the frames are provided with chains I, to which the draft is attached, and the side and end pieces of the frames have teeth J secured in them in the usual manner, but standing in zigzag lines along the said side and end pieces, by which arrangement they will accomplish a finer pulverization of the soil than teeth arranged in straight lines. The rear ends of the frames are provided with the halves of pintle-hinges K, the other halves of which hinges are secured upon the forward ends of the side pieces of two rectangular frames, L, open at their forward ends. A flat bar, M, having its ends bent at right angles, as shown at N, is secured in the open forward end of each of these frames by means of bolts or screws O passing through the perforated bent ends of the bar, and the bar is provided with a number of flat cutting-teeth, P, sharpened upon their forward edges, projecting from the flat side of the bar in the same direction as the bent ends, the angle of which teeth may be adjusted by turning the ends of the bar, and consequently the bar upon the screws, and again securing them. At the middle of each of the rectangular frames is journaled a transverse shaft, Q, having a number of sharpened and pointed crusher-teeth, R, secured upon them, the shaft being square and the teeth provided with square perforations at their middles, which perforations fit upon the shaft. The end pieces of the rectangular frames are formed with a rabbet, S, in their upper forward edges, and have a number of horizontal perforations, T, and a marker-tooth, U, having its upper end, V, bent at a right angle to the tooth, is secured to each end piece at any desired point by means of a bolt, W, passing through one of the perforations, and provided with a nut, the bent upper end of the tooth fitting in the rabbet, keeping the tooth from turning laterally. A handle, X, having a hinge, Y, at its middle, and provided with a hook and bail or staple, Z, upon the side opposite to the hinge, for the purpose of securing it from swinging or bending upon the hinge, is pivoted upon the side of the inner side piece of each frame, and a hook, A', is pivoted upon the handle a distance from the pivoted end of the same, adapted to engage a staple, B', upon the side piece of the frame to the rear of the pivotal point of the handle, by means of which hook the handle may be adjusted to a rearwardly-inclined position. In this manner it will be seen that the entire harrow may be collapsed or folded to occupy but comparatively little space, and that the rear frames and the forward frames may be detached from each other, when the forward frames may be used as a common pulverizing-harrow, and the rear frames as a stalk-cutting and clod-crushing device, and the adjustable teeth upon the rear end pieces of the frames will act as markers.

When the entire implement is used, the forward portion will pulverize the soil in the manner of a usual harrow, the cutter-teeth and the revolving crusher-teeth will cut weeds and crush and pulverize everything left by the forward frame, and the markers upon the rear frames will mark the soil, leaving it ready in one operation to receive any crop planted in rows.

Having thus described my invention, I claim and desire to secure by Letters Patent of the United States—

1. The combination of the rectangular frame, open at its forward end, the flat bar having its ends bent at right angles and provided with cutter-teeth sharpened upon their forward edges, and the screws passing through the perforated ends of the flat bar into the inner sides of the side pieces of the frame, as and for the purpose shown and set forth.

2. The combined harrow, stalk-cutter, clod-crusher, and land-marker, consisting of two frames having converging outer side pieces provided with harrow-teeth and hinged together at their inner side pieces, and two rectangular frames hinged to the rear ends of the harrow-frames, having adjustable inclined cutter-teeth in their forward ends, revolving crusher-teeth at their middles, and land-marking teeth secured adjustably upon their end pieces, all constructed and arranged as and for the purpose shown and set forth.

In testimony that I claim the foregoing as my own I have hereunto affixed my signature in presence of two witnesses.

GEORGE F. CLARK.

Witnesses:
WILLIAM A. HOLLAND,
JOHN H. MAHON.